United States Patent
Clayton et al.

(10) Patent No.: US 9,752,509 B2
(45) Date of Patent: Sep. 5, 2017

(54) METHOD FOR CONTROLLING COUPLING OF SHAFTS BETWEEN A FIRST MACHINE AND A SECOND MACHINE USING ROTATION SPEEDS AND ANGLES

(71) Applicants: Peter Jon Clayton, Casselberry, FL (US); Joseph David Hurley, Casselberry, FL (US); Albert C. Sismour, Jr., Casselberry, FL (US); Melissa A. Batis-Carver, Titusville, FL (US)

(72) Inventors: Peter Jon Clayton, Casselberry, FL (US); Joseph David Hurley, Casselberry, FL (US); Albert C. Sismour, Jr., Casselberry, FL (US); Melissa A. Batis-Carver, Titusville, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 533 days.

(21) Appl. No.: 14/010,669

(22) Filed: Aug. 27, 2013

(65) Prior Publication Data

US 2015/0059347 A1   Mar. 5, 2015

(51) Int. Cl.
*F02C 7/36* (2006.01)
*F01K 23/10* (2006.01)
*F01K 23/16* (2006.01)

(52) U.S. Cl.
CPC ............. *F02C 7/36* (2013.01); *F01K 23/101* (2013.01); *F01K 23/16* (2013.01); *F05D 2270/023* (2013.01); *Y02E 20/16* (2013.01)

(58) Field of Classification Search
CPC .......... F02C 7/36; F01K 23/101; F01K 23/16; F05D 2290/023
See application file for complete search history.

(56) References Cited

U.S. PATENT DOCUMENTS

| 4,340,820 A | 7/1982 | Meyer-Pittroff et al. |
| 4,349,744 A | 9/1982 | Reuther et al. |

(Continued)

FOREIGN PATENT DOCUMENTS

| CN | 101059101 A | 10/2007 |
| CN | 101644178 A | 2/2010 |

(Continued)

OTHER PUBLICATIONS

Larry Covino; Where Should a Keyphasor Transducer be Mounted?; Back-to-Basics; Jun. 1994; pp. 26-27.

(Continued)

*Primary Examiner* — Pascal M Bui Pho
*Assistant Examiner* — Marc Amar (57) ABSTRACT

A method for controlling coupling between a first machine including a first rotating shaft having an associated first positional phase angle defined by a first shaft indicia and a second machine including a second rotating shaft having an associated second positional phase angle defined by a second shaft indicia. A rotational speed and rotational angle of the first shaft are monitored, and rotation of the second shaft is controlled by bringing the second shaft to a predetermined rotational speed relative to the first shaft speed. Acceleration of the second shaft is controlled such that the second shaft indicia is within a predetermined angle relative to the first shaft indicia upon the second shaft being brought to the predetermined rotational speed, at which point the first and second shafts are coupled such that the second shaft indicia is within the predetermined angle relative to the first shaft indicia.

14 Claims, 6 Drawing Sheets

(56) References Cited

U.S. PATENT DOCUMENTS

| | | | |
|---|---|---|---|
| 5,610,500 A | 3/1997 | Giberson | |
| 6,140,803 A | 10/2000 | Hurley et al. | |
| 6,347,289 B1* | 2/2002 | VanderLeest | 702/115 |
| 6,817,186 B2 | 11/2004 | Tanaka | |
| 8,137,240 B2* | 3/2012 | Humer et al. | 477/107 |
| 2004/0011040 A1 | 1/2004 | Tanaka et al. | |
| 2004/0055273 A1* | 3/2004 | Hirayama et al. | 60/39.281 |
| 2004/0192500 A1* | 9/2004 | Tokura et al. | 477/109 |
| 2005/0183422 A1 | 8/2005 | Takai et al. | |
| 2008/0245071 A1 | 10/2008 | Kawakami et al. | |
| 2009/0325765 A1* | 12/2009 | Humer et al. | 477/180 |
| 2011/0010128 A1* | 1/2011 | Hempl | 702/151 |

FOREIGN PATENT DOCUMENTS

| | | |
|---|---|---|
| CN | 102257246 A | 11/2011 |
| DE | 4426354 A1 | 2/1996 |

OTHER PUBLICATIONS

K.R.Rao; Turbine Protective Devices; Cogen Power Plant; Nov. 27, 2008; C&I Division, Triveni Engineering Industries & Ltd., Khatauli; pp. 1-22.

\* cited by examiner

METHOD FOR CONTROLLING COUPLING OF SHAFTS BETWEEN A FIRST MACHINE AND A SECOND MACHINE USING ROTATION SPEEDS AND ANGLES

FIELD OF THE INVENTION

The present invention relates generally to controlling coupling between a first machine and a second machine, and, more specifically, to controlling coupling of a rotating shaft of a gas turbine with a rotating shaft of a steam turbine in a combined cycle power plant.

BACKGROUND OF THE INVENTION

A combined cycle turbine generator (CCTG) utilizes both a gas turbine and a steam turbine to drive a generator. In one type of typical CCTG, exhaust gases from the gas turbine create steam, which steam is used to power the steam turbine. In some CCTGs, a clutch apparatus is used to couple a rotating shaft associated with the steam turbine to a rotating shaft associated with the gas turbine, wherein the combined shaft is used to provide work output to the generator for the production of electrical power.

SUMMARY OF THE INVENTION

In accordance with a first aspect of the invention, a method is provided for controlling coupling between a first machine and a second machine, the first machine including a first rotating shaft having an associated first positional phase angle defined by a first shaft indicia and the second machine including a second rotating shaft having an associated second positional phase angle defined by a second shaft indicia. The method comprises monitoring a rotational speed and rotational angle of the first shaft, and controlling rotation of the second shaft by bringing a rotational speed of the second shaft to a predetermined rotational speed relative to the monitored rotational speed of the first shaft. Acceleration of the second shaft is controlled such that the second shaft indicia is within a predetermined angle relative to the first shaft indicia upon the second shaft being brought to the predetermined rotational speed, at which time a coupling is actuated to mechanically couple the first and second shafts together such that the second shaft indicia is within the predetermined angle relative to the first shaft indicia.

In accordance with a second aspect of the invention, a method is provided for controlling coupling between a gas turbine and a steam turbine in a combined cycle power plant. The gas turbine includes a first rotating shaft having an associated first positional phase angle defined by a first shaft indicia and the steam turbine includes a second rotating shaft having an associated second positional phase angle defined by a second shaft indicia. The method comprises monitoring a rotational speed and rotational angle of the first shaft, and controlling rotation of the second shaft by increasing a rotational speed of the second shaft to a predetermined rotational speed relative to the monitored rotational speed of the first shaft such that the second shaft indicia is at a predetermined angle relative to the first shaft indicia upon the second shaft being brought to the predetermined rotational speed. During the step of controlling rotation of the second shaft, the first shaft rotates at a substantially constant speed. Upon the second shaft being brought to the predetermined rotational speed, a coupling is actuated to mechanically couple the first and second shafts such that the second shaft indicia is at the predetermined angle relative to the first shaft indicia.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

According to the present invention, a method for controlling coupling between a first machine and a second machine is disclosed. The first machine may be a gas turbine including a first shaft and the second machine may be a steam turbine including a second shaft. The gas and steam turbines are components of a combined cycle turbine generator, wherein the steam turbine may be driven by exhaust gases from the gas turbine, e.g., with the use of a conventional steam recovery system. The first and second shafts of the respective machines are coupled together such that vibrational vectors of the shafts cooperate with one another when coupled together to effect a combined shaft with a desired vibrational response, as will be described herein. For example, vibrational vectors of the first and second shafts may offset each other when coupled together to effect a substantially balanced combined shaft.

Figure 1:
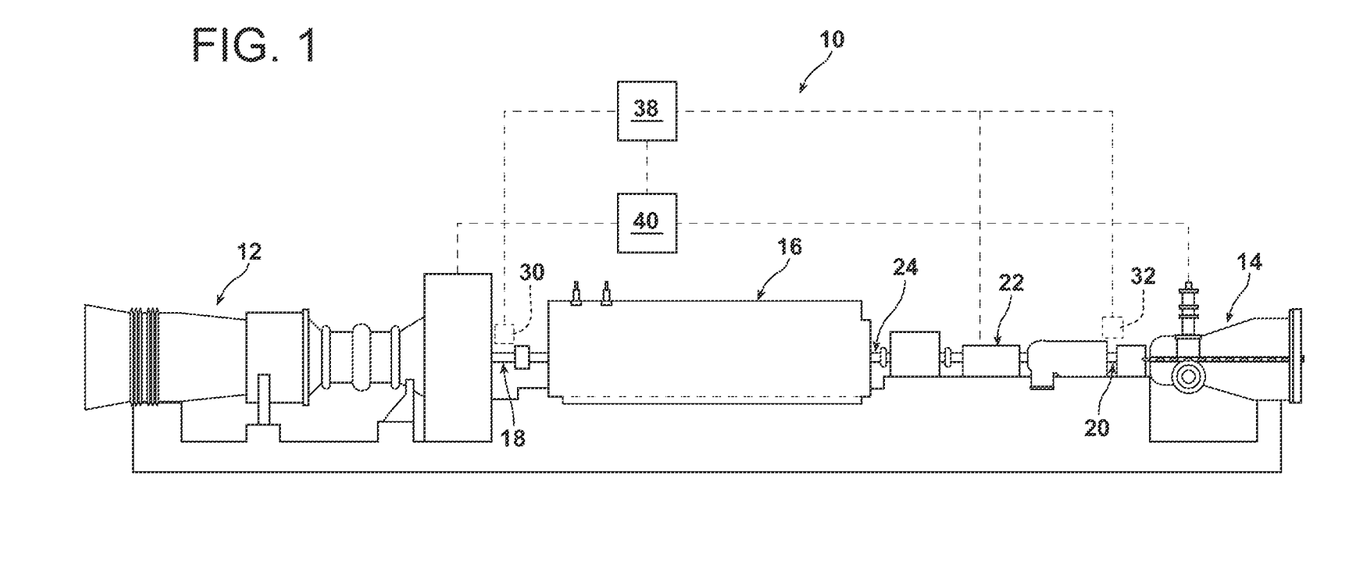
FIG. 1 is a schematic diagram of a combined cycle turbine generator that includes a control system for controlling engagement of a first machine, illustrated in FIG. 1 as a gas turbine engine, to a second machine, illustrated in FIG. 1 as a steam turbine engine, according to an aspect of the present invention.

Referring now to FIG. 1, a combined cycle power plant, and, more specifically, a combined cycle turbine generator (hereinafter "CCTG") 10, according to an aspect of the present invention is schematically shown. The CCTG 10 includes a first machine comprising a gas turbine 12 and a second machine comprising a steam turbine 14, wherein the gas and steam turbines 12, 14 cooperate to provide work output to a generator 16 of the CCTG 10 for the production of electrical power. The gas turbine 12 may include conventional compression, combustion, and turbine sections, and the steam turbine 14 may include conventional condenser, boiler, and turbine sections. The configuration of each of these sections will be readily apparent to those having ordinary skill in the art and will not be specifically discussed herein.

The gas turbine 12 also includes a first rotatable shaft, also referred to herein as an input shaft 18, and the steam turbine 14 includes a second rotatable shaft, also referred to herein as an output shaft 20. A synchro-self shifting clutch apparatus (hereinafter "clutch") 22 is provided to couple the input and output shafts 18, 20 together in accordance with teachings of the present invention, as will be described herein. When coupled together, the input and output shafts 18, 20 may be referred to herein as a combined shaft 24. As shown in FIG. 1, the combined shaft 24 is coupled to the generator 16 and drives the generator 16 for the production of electrical power in a manner that will be apparent to those having ordinary skill in the art.

Figure 2:
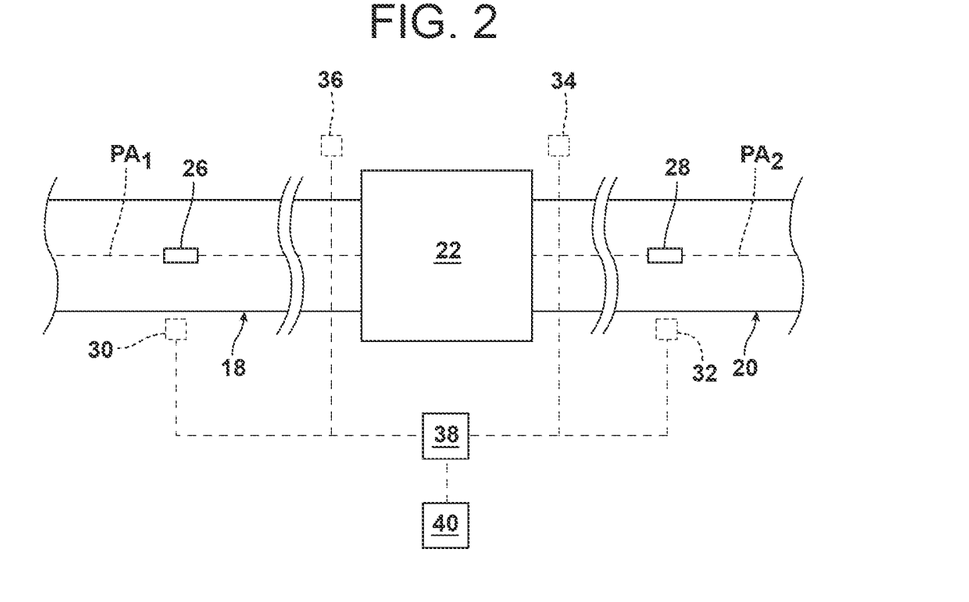
FIG. 2 is a schematic diagram illustrating select components of the combined cycle turbine generator of FIG. 1.

Referring now to FIG. 2, the input and output shafts 18, 20 each have a positional phase angle $PA_1$, $PA_2$ defined by respective first and second shaft indicia 26, 28. It is noted that while the positional phase angle $PA_1$, $PA_2$ of each shaft 18, 20 may be directly circumferentially aligned with the respective shaft indicia 26, 28 as shown in FIG. 2, this need not be the case. What is required is that the location of each positional phase angle $PA_1$, $PA_2$ be known with respect to the location of the respective shaft indicia 26, 28, i.e., such that the location of the positional phase angle $PA_1$, $PA_2$ of each shaft 18, 20 can be predicted based on the location of the respective shaft indicia 26, 28.

The shaft indicia 26, 28 may be a notch or tooth formed on the respective shaft 18, 20 or any other suitable indicia. During operation of the CCTG 10, the first and second shaft indicia 26, 28 are sensed by respective first and second once per revolution sensors 30, 32. The sensors 30, 32 sense the passing of the respective shaft indicia 26, 28 at each rotation of the shafts 18, 20 to determine the positional phase angles $PA_1$, $PA_2$ of the respective shafts 18, 20. The sensors may comprise KEYPHASOR® sensors (KEYPHASOR is a registered trademark of BENTLY NEVADA, INC.) or any other suitable type of sensors capable of detecting the positional phase angles $PA_1$, $PA_2$ of the respective shafts 18, 20.

The CCTG 10 also includes first and second speed sensors 34, 36 for monitoring rotational speeds of the respective input and output shafts 18, 20. The speeds sensors 34, 36 may comprise, for example, frequency transducers, which respectively count gear teeth within a time period, although other rotational speed indicating sensors may be used, such as tachometers. The speed sensors 34, 36 provide signals indicative of rotational speeds of the input and output shafts 18, 20 to a control system 38 (see FIGS. 1 and 2), which determines rotational speeds and rates of change in speeds of the input and output shafts 18, 20 based on the signals in a manner as disclosed in U.S. Pat. No. 6,140,803 to Joseph David Hurley et al., issued Oct. 31, 2000 and entitled "APPARATUS AND METHOD FOR SYNCHRONIZING A SYNCHRONOUS CONDENSER WITH A POWER GENERATION SYSTEM," the entire disclosure of which is hereby incorporated by reference herein. It is noted that the first and second once per revolution sensors 30, 32 are also capable of determining rotational speeds of the shafts 18, 20, and are thus capable of acting as the first and second speed sensors 34, 36, i.e., the invention is not intended to be limited to using separate once per revolution sensors 30, 32 and speed sensors 34, 36.

Figure 3:
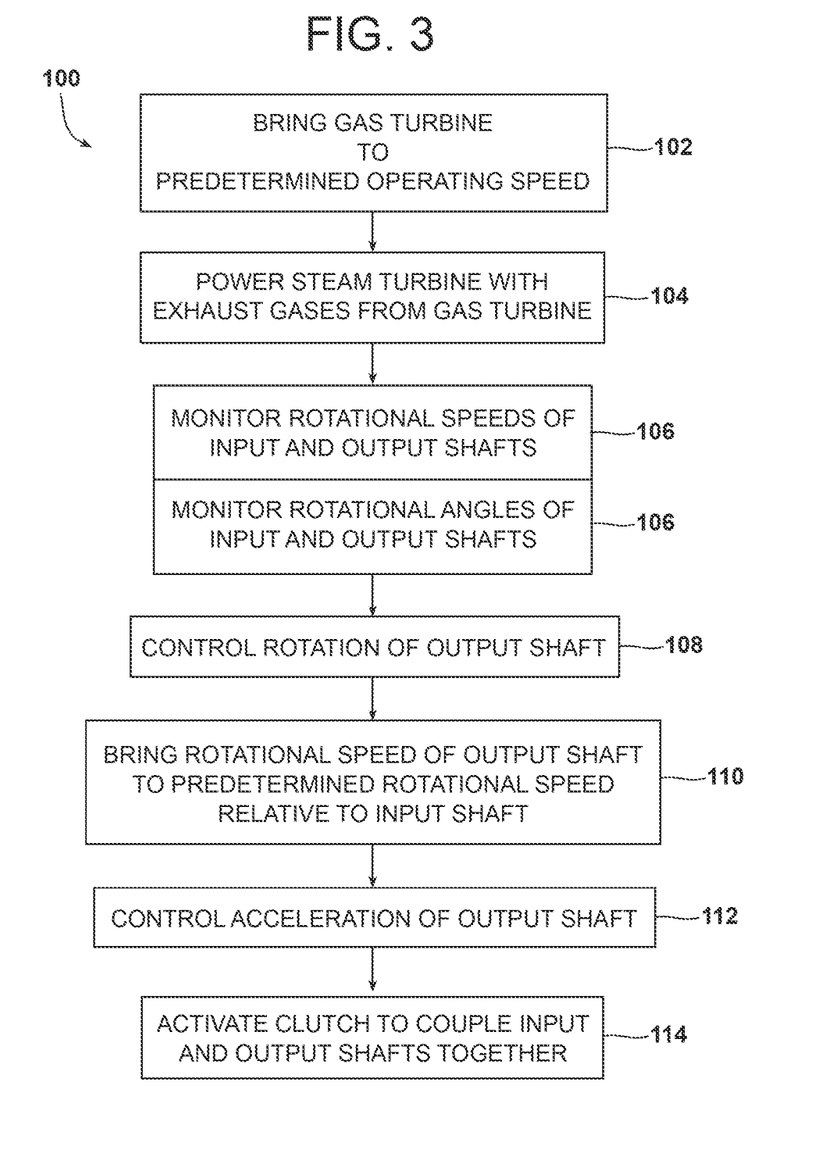
FIG. 3 is a flow diagram illustrating a method for controlling engagement of the gas turbine shaft of FIG. 1 to the steam turbine shaft of FIG. 1.

The clutch 22 may comprise, for example, a conventional SSS clutch apparatus having a number of gear teeth associated with each of the respective input and output shafts 18, 20, wherein the number of gear teeth for each shaft 18, 20 predicts the number of possible angular engagement positions in which the input shaft 18 can be coupled to the output shaft 20. The clutch 22 could alternatively comprise any suitable type of clutch or comparable apparatus. As described herein, the clutch 22 engages the shafts 18, 20 under predetermined conditions to couple the shafts 18, 20 together to form the combined shaft 24. It is noted that the respective gear teeth of the clutch 22 may be previously engaged with one of the shafts 18, 20 before the shaft coupling procedure, such that the clutch 22 need only engage the other of the shafts 18, 20 to effect the shaft coupling, or the respective gear teeth of the clutch 22 may engage both of the shafts 18, 20 during the shaft coupling procedure to effect the shaft coupling. Referring to FIG. 3, a method 100 of operating the CCTG 10 according to an aspect of the present invention is shown. In step 102, the gas turbine 12 is brought to a predetermined operating speed whereby rotation of the input shaft 18 is effected. The predetermined operating speed may be a normal operating speed of the gas turbine 12 or some other predetermined speed. The gas turbine 12 is then typically synchronized to a power grid (not shown) through the generator 16. The speed of the gas turbine 12 is subsequently held substantially constant by the frequency of the grid, regardless of the power output of the gas turbine 12.

In step 104, exhaust gases from the gas turbine 12 are used to power a steam generator (not shown) for supplying steam to the steam turbine 14 to effect rotation of the output shaft 20. The control system 38 controls a valve system 40 (see FIGS. 1 and 2) to control, via valves on the steam turbine 14, the amount of steam flow allotted to the steam turbine 14 so as to control rotational parameters, e.g., rotational velocity and acceleration, of the output shaft 20.

At step 106, rotational speeds of the input and output shafts 18, 20 are monitored, e.g., with the first and second speed sensors 34, 36 or with any other suitable velocity sensors, and rotational angles of the input and output shafts 18, 20 are monitored with the first and second sensors 30, 32. The rotational speeds of the shafts 18, 20 are used to determine accelerations of the shafts 18, 20 as described in U.S. Pat. No. 6,140,803, which has been incorporated by reference herein. The rotational angles of the shafts 18, 20 are used in conjunction with the sensed positions of the respective shaft indicia 26, 28 to predict the positional phase angles $PA_1$, $PA_2$ of the respective shafts 18, 20.

At step 108, rotation of the output shaft 20 is controlled by the control system 38 such that the input and output shafts 18, 20 are mechanically coupled together by the clutch 22 with the second shaft indicia 28 being within a predetermined angle relative to the first shaft indicia 26, e.g., such that the positional phase angles $PA_1$, $PA_2$ of the respective shafts 18, 20 are within a predetermined angle relative to one another.

Specifically, at step 110, the rotational speed of the output shaft 20 is brought to a predetermined rotational speed relative to the monitored rotational speed of the input shaft 18. The predetermined rotational speed is preferably very close to the speed of the input shaft. During step 110, the acceleration of the output shaft 20 is controlled at step 112 such that the second shaft indicia 28 is brought to be within the predetermined angle relative to the first shaft indicia 26 at the precise time that the output shaft 20 is brought to the predetermined rotational speed. It is noted that during steps 108-112, the input shaft 18 preferably rotates at a substantially constant speed, which may correspond to the normal operating speed of the gas turbine 12.

Upon the output shaft 20 being brought to the predetermined rotational speed, a coupling is actuated mechanically, e.g., by an operator, or by the control system 38 at step 114, wherein the clutch 22 engages the input and output shafts 18, 20 to mechanically couple the shafts 18, 20 together. For example, clutch teeth of the clutch 22 associated with the output shaft 20 may be axially shifted into engagement with corresponding clutch teeth on the output shaft 20 in a known manner that will be readily apparent to those having ordinary skill in the art. Step 114 is performed at a precise time when the second shaft indicia 28 is within the predetermined angle relative to the first shaft indicia 26 as a result of the actions taken at steps 108-112.

One particularly advantageous consequence of coupling the input and output shafts 18, 20 together as described herein is that vibrational vectors of the input and output shafts 18, 20 cooperate with one another to effect a combined shaft 24 with a desired vibrational response. For example, the input and output shafts 18, 20 may be coupled together at the predetermined angle to effect a reduction in vibrations in the gas and steam turbines 12, 14, i.e., wherein the vibrational vectors of the input and output shafts 18, 20 offset each other when coupled together to effect a substantially balanced combined shaft 24. It is noted that the input and output shafts 18, 20 could be coupled together at other predetermined angles to effect advantages other than to effect a substantially balanced combined shaft 24.

By monitoring and controlling the acceleration of the output shaft 20 as described herein, the rotational speed of the output shaft 20 is able to be brought to the predetermined rotational speed in a controlled manner such that the clutch 22 is engaged with both the input and output shafts 18, 20 at the precise time when the relative positional phase angle between the shafts 18, 20 is zero or some other predetermined value to effect a combined shaft 24 with a desired vibrational response.

It is noted that while the method 100 is described herein with the control system 38 automatically controlling the rotation of the output shaft 20, an operator may control one or more aspects of the output shaft rotation control.

Figure 4A:
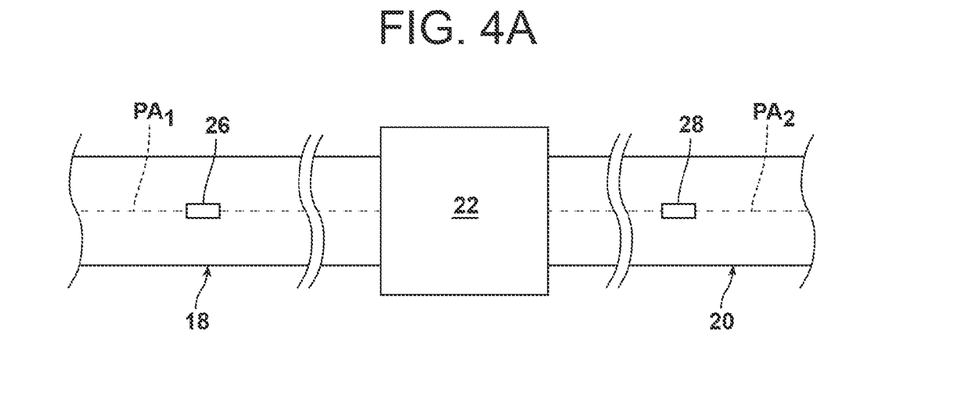
FIG. 4A-4D are schematic diagrams illustrating various possible engagement angles between the gas turbine shaft of FIG. 1 to the steam turbine shaft of FIG. 1.

Referring now to FIGS. 4A-D, a few exemplary engagement angles between the input and output shafts 18, 20 are shown. In FIG. 4A, the first shaft indicia 26 of the input shaft 18 is directly in line with the second shaft indicia 28 of the output shaft 20. Assuming the positional phase angles $PA_1$, $PA_2$ of the shafts 18, 20 are aligned with the respective shaft indicia 26, 28, the resulting combined shaft 24 shown in FIG. 4A is substantially balanced so as to effect a reduction in vibration in the gas and steam turbines 12, 14.

Figure 4B:
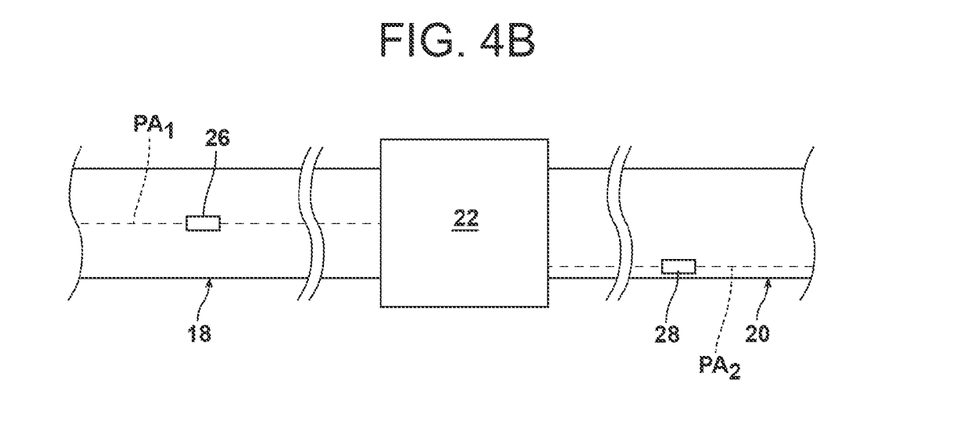
Figure 4C:
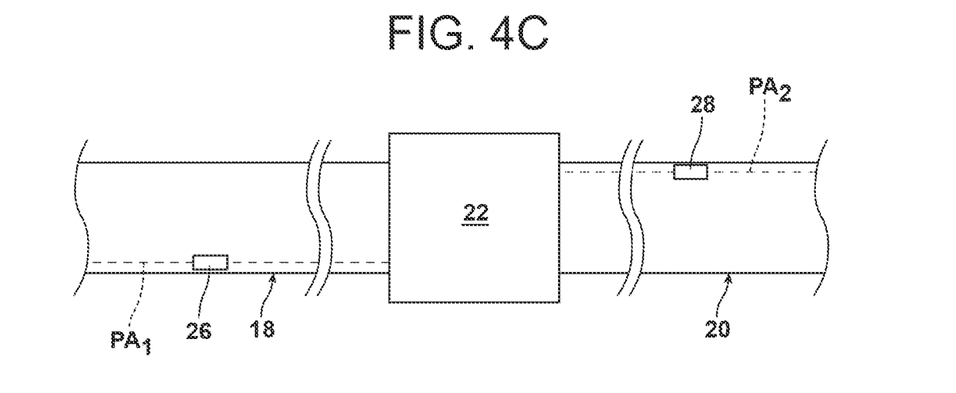
Figure 4D:
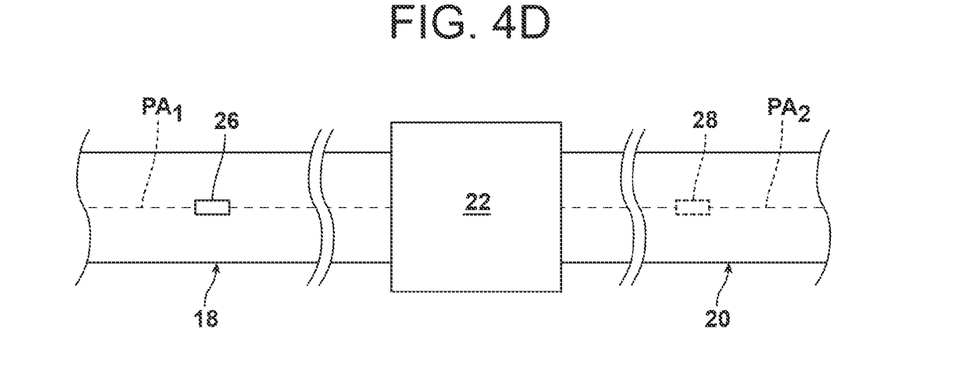

FIGS. 4B-D illustrate unbalanced combined shafts 24, again, assuming that the positional phase angles $PA_1$, $PA_2$ of the shafts 18, 20 are aligned with the respective shaft indicia 26, 28 (it is noted that in FIG. 4D, the positional phase angle $PA_2$ of the output shaft 20 is shown in dashed lines to indicate that it is located on the opposite side of the output shaft 20).

Figure 5:
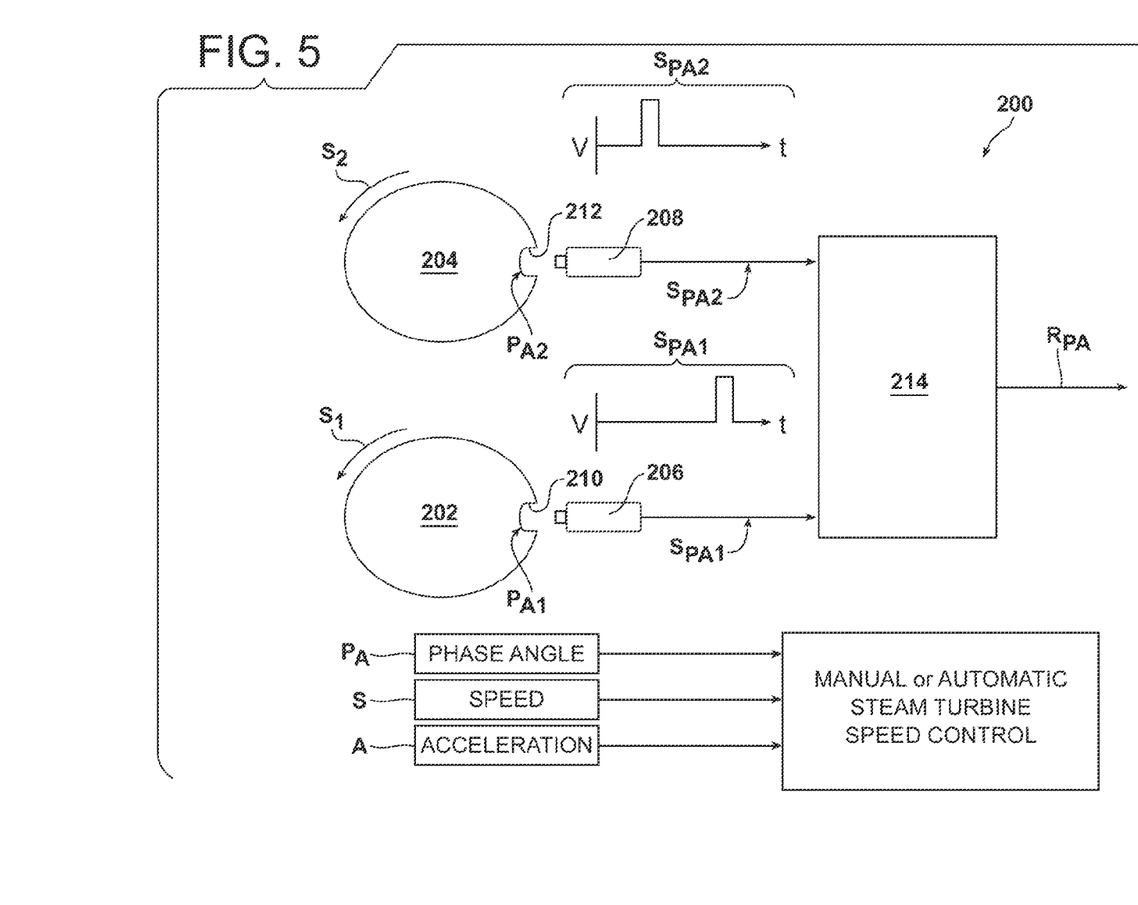
FIG. 5 is a schematic illustration of components of a control system for controlling engagement of a gas turbine shaft to a steam turbine shaft according to an aspect of the present invention.

Referring now to FIG. 5, exemplary details are depicted in connection with how a turbine control system 200 controls machine operating parameters such that a clutch coupled to a gas turbine shaft 202, such as the clutch 22 described above, is able to engage a steam turbine shaft 204 at a desired clutch tooth position.

In conventional shaft coupling procedures, only shaft rotational speeds are used as feedback signals (for automatic control) or as a monitored quantity (for manual control) for controlling clutch engagement. However, according to an aspect of the present invention, the turbine control system 200, whether being operated manually or automatically to control clutch engagement, uses three quantities, specifically, acceleration A, speed S, and phase angle $P_A$ of the respective shafts 202, 204, such that the clutch engages the shafts 202, 204 with a desired relative phase angle $R_{PA}$. Prior to clutch engagement, the speed $S_1$ of the gas turbine shaft 202 will generally be constant at synchronous speed (with the generator synchronized to the power grid), and the steam turbine shaft 204 will be at some lower speed $S_2$. If the speed $S_2$ of the steam turbine shaft 204 is increased to synchronous speed without regard to acceleration, then it is likely that the clutch will engage on a random tooth, wherein the shafts 202, 204 would not be engaged at the desired relative phase angle $R_{PA}$. To avoid this situation, in the present invention, as the speed $S_2$ of the steam turbine shaft 204 is increasing and approaching synchronous speed, the turbine control system 200 controls the acceleration of the steam turbine shaft 204 such that it is reduced to a very low value. Then, just as the speed $S_2$ of the steam turbine shaft 204 reaches a speed just below the speed $S_1$ of the gas turbine shaft, e.g., synchronous speed, the turbine control system 200 controls the acceleration of the steam turbine shaft 204 such that the acceleration thereof is zero or very near zero.

At this point, phase angle detectors 206, 208, also referred to herein as once per revolution sensors, associated with the respective shafts 202, 204 may be utilized. Each shaft 202, 204 includes a positional phase angle $PA_1$, $PA_2$ defined by respective first and second shaft indicia 210, 212 as discussed herein. The positional phase angles $PA_1$, $PA_2$ are measured by the phase angle detectors 206, 208 as described herein. The phase angle detectors 206, 208 detect the difference in time in which the respective first and second shaft indicia 210, 212 are detected during each respective shaft rotation, and provide a respective signal $S_{PA1}$, $S_{PA2}$ to a control module 214. The control module 214 used the signals $S_{PA1}$, $S_{PA2}$ to determine the relative phase angle $R_{PA}$ between the sensed first and second shaft indicia 210, 212.

When the speed $S_2$ of the steam turbine shaft 204 is slightly below synchronous speed and the acceleration thereof is zero (or near zero), the positional phase angle $PA_2$ thereof will be slowly changing, if at all. The turbine control system 200 (or operator, if the clutch engagement is manually controlled) waits until the positional phase angle $PA_2$ of the steam turbine shaft 204 is at the desired value relative to the positional phase angle $PA_1$ of the gas turbine shaft 202, and at this instant the turbine control system 200 will act to quickly accelerate the steam turbine shaft 204 and engage the clutch. The result is the clutch engaging the steam turbine shaft 204 at the desired relative phase angle $R_{PA}$, i.e. on the proper tooth of the clutch, to effect a substantially balanced combined shaft.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for controlling coupling between a first machine and a second machine, the first machine including a first rotating shaft having a first shaft indicia and the second machine including a second rotating shaft having a second shaft indicia, the method comprising:

monitoring a rotational speed and rotational angle of the first shaft;
controlling rotation of the second shaft comprising:
determining a first positional phase angle of the first rotating shaft,
determining a second positional phase angle of the second rotating shaft,
determining a relative phase angle between the first positional phase angle and the second positional phase angle,
controlling the rotational speed of the first shaft constantly at a synchronous speed,
accelerating the second shaft to a predetermined rotational speed relative to the synchronous speed of the first shaft,
reducing the acceleration of the second shaft when a rotational speed of the second shaft is approaching the synchronous speed so that the second positional phase angle is slowly changing,
waiting until the second positional phase angle is within a predetermined relative phase angle to the first positional phase angle, and
coupling the first and second shafts at the same time when the second shaft is brought to the predetermined rotational speed and the second positional phase angle is within the predetermined relative phase angle,
wherein the first positional phase angle of the first shaft is determined by a first once per revolution sensor sensing a position of the first shaft indicia at each rotation of the first shaft, and
wherein the second positional phase angle of the second shaft is determined by a second once per revolution sensor sensing a position of the second shaft indicia at each rotation of the second shaft.

2. The method of claim 1, wherein the first machine is a gas turbine and the second machine is a steam turbine.

3. The method of claim 2, wherein exhaust gases from gas turbine are used to power the steam turbine to effect rotation of the second shaft.

4. The method of claim 1, wherein, during the step of controlling rotation of the second shaft, the first shaft rotates at a substantially constant speed and the speed of the second shaft is increased.

5. The method of claim 1, wherein the predetermined rotational speed comprises a normal operating speed of the first shaft.

6. The method of claim 1, wherein the first and second shaft indicia each comprise one of a notch and a tooth.

7. The method of claim 1, wherein the first and second shafts are coupled together at the predetermined relative phase angle to effect a reduction in vibration in the first and second machines.

8. The method of claim 7, wherein vibrational vectors of the first and second shafts offset each other when coupled together to effect a substantially balanced combined shaft.

9. A method for controlling coupling between a gas turbine and a steam turbine in a combined cycle power plant, the gas turbine including a first rotating shaft having a first shaft indicia and the steam turbine including a second rotating shaft having a second shaft indicia, the method comprising:
monitoring a rotational speed and rotational angle of the first shaft;
controlling rotation of the second shaft comprising:
determining a first positional phase angle of the first rotating shaft,
determining a second positional phase angle of the second rotating shaft,
determining a relative phase angle between the first positional phase angle and the second positional phase angle,
controlling the rotational speed of the first shaft constantly at a synchronous speed,
accelerating the second shaft to a predetermined rotational speed relative to the synchronous speed of the first shaft,
reducing the acceleration of the second shaft when a rotational speed of the second shaft is approaching the synchronous speed so that the second positional phase angle is slowly changing,
waiting until the second positional phase angle is at a predetermined relative phase angle to the first positional phase angle, and
coupling the first and second shafts at the same time when the second shaft is brought to the predetermined rotational speed and the second positional phase angle is at the predetermined relative phase angle,
wherein a position of the first shaft indicia at each rotation of the first shaft is sensed by a first once per revolution sensor to determine the first positional phase angle of the first shaft and a position of the second shaft indicia at each rotation of the second shaft is sensed by a second once per revolution sensor to determine the second positional phase angle of the second shaft.

10. The method of claim 9, wherein exhaust gases from gas turbine are used to power the steam turbine to effect rotation of the second shaft.

11. The method of claim 9, wherein the predetermined rotational speed comprises a normal operating speed of the first shaft.

12. The method of claim 9, wherein the first and second shaft indicia each comprise one of a notch and a tooth.

13. The method of claim 9, wherein the first and second shafts are coupled together at the predetermined relative phase angle to effect a reduction in vibration in the first and second machines.

14. The method of claim 13, wherein vibrational vectors of the first and second shafts offset each other when coupled together to effect a substantially balanced combined shaft.

* * * * *